J. MOORE.
INSIDE DIVIDERS FOR HARVESTERS.

No. 180,618. Patented Aug. 1, 1876.

UNITED STATES PATENT OFFICE.

JAMES MOORE, OF PESCADERO, CALIFORNIA.

IMPROVEMENT IN INSIDE DIVIDERS FOR HARVESTERS.

Specification forming part of Letters Patent No. 180,618, dated August 1, 1876; application filed December 30, 1875.

*To all whom it may concern:*

Be it known that I, JAMES MOORE, of Pescadero, San Mateo county, State of California, have invented an Improved Inside Divider for Harvesting or Reaping Machines, of which the following is a specification:

My invention relates to an improvement in inside divider for harvesting-machines; and consists in combining with said divider a curved adjustable wire guide for raising and turning the stalks of grain over against the sickle or cutter-bar, as will be more fully set forth hereinafter.

Figure 1:
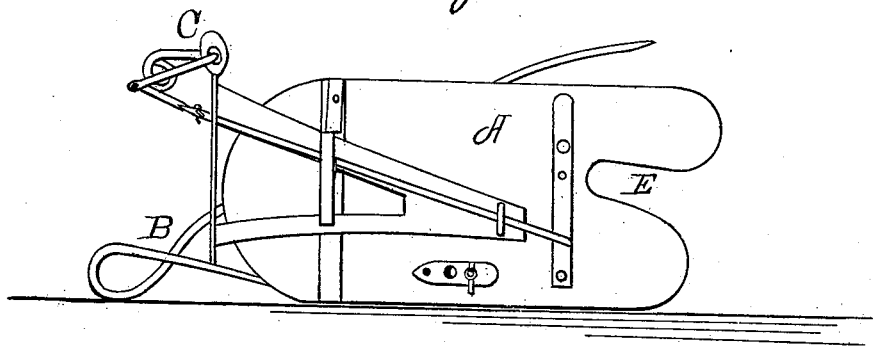
Figure 2:
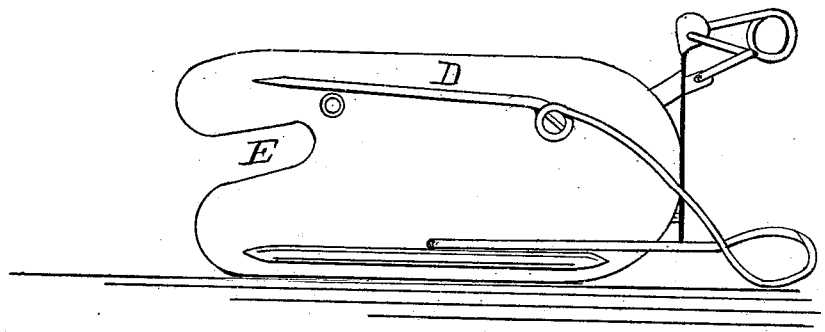
Figure 3:
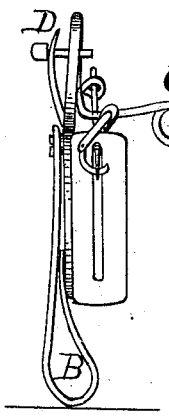

In the accompanying drawing, herein referred to for a better understanding of the description, Figure 1 is a side elevation, showing the outer side of the inside divider. Fig. 2 is a view of the opposite side, and Fig. 3 is a front view with the back raised.

This inside divider is employed to raise the heads and stalks of grain in the path of the machine along the edge of the swath, where they have been trodden down by the horses, and to turn them over against the finger-bar, so that the machine shall cut the stalks instead of passing over them.

The improvement consists in combining with this inside divider a curved adjustable wire guide, extending out beyond the face and the front end of the divider, and bent into such form that it shall turn the heads of the grain over against the finger-bar as it raises them.

This form is shown in the figures of the accompanying drawing, where A is the inside divider; B, the curved wire guide, and C the handle and rod for raising the end of the divider from the ground. D is the gather-rod, and E the slot that fits over the rod or other portion of the finger-bar, at the end nearest the drive-wheel, and that holds the board in place.

The form of this inside divider is not new with me, nor is the use and arrangement of the gather-rod and the lifting-rod and lever; but my invention consists in the attachment therewith of the wire guide B, to raise the heads of the grain in advance of the edge of the inside divider. Its office will be readily understood by any one familiar with the construction and use of harvesting machinery, and it can be applied to the inside divider now in use.

The end of the rod is made adjustable at the point where it enters the divider by having an additional hole, $a$, so that the loop end may be thrown and raised up higher when desired.

Having thus fully described my invention, what I claim therein as new, and desire to secure by Letters Patent, is—

The combination, with the inside divider of a reaping-machine, of the curved adjustable guide, constructed and arranged substantially as described and shown.

In witness whereof I have hereunto set my hand and seal.

JAMES MOORE. [L. S.]

Witnesses:
G. THOMPSON,
E. W. THOMPSON.